United States Patent
Park et al.

(10) Patent No.: US 10,473,380 B2
(45) Date of Patent: Nov. 12, 2019

(54) LIQUID DISPENSER

(71) Applicant: LG ELECTRONICS INC., Seoul (KR)

(72) Inventors: Jongwoo Park, Seoul (KR); Yongbum Kim, Seoul (KR); Suchang Cho, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/755,169

(22) PCT Filed: Aug. 18, 2016

(86) PCT No.: PCT/KR2016/009056
§ 371 (c)(1),
(2) Date: Feb. 26, 2018

(87) PCT Pub. No.: WO2017/034209
PCT Pub. Date: Mar. 2, 2017

(65) Prior Publication Data
US 2018/0216868 A1    Aug. 2, 2018

(30) Foreign Application Priority Data

Aug. 27, 2015  (KR) .................. 10-2015-0120682

(51) Int. Cl.
*F25D 19/00* (2006.01)
*F25B 39/02* (2006.01)
(Continued)

(52) U.S. Cl.
CPC ........ *F25D 19/006* (2013.01); *B01D 39/2055* (2013.01); *F25B 39/02* (2013.01);
(Continued)

(58) Field of Classification Search
CPC .......... F25D 19/006; F25D 23/00; F25D 3/10; F25D 31/002; F25D 11/02; F25D 2400/02; F28D 7/024; F28D 1/0472; F28F 13/125; F28F 2250/08; B01D 39/2055; F25B 39/02; B67D 1/00; B67D 1/0861
See application file for complete search history.

(56) References Cited

FOREIGN PATENT DOCUMENTS

| JP | 2006-308206 | 11/2006 |
|----|-------------|---------|
| KR | 10-2010-0136093 | 12/2010 |

(Continued)

OTHER PUBLICATIONS

International Search Report (with English Translation) and Written Opinion dated Dec. 2, 2016 issued in Application No. PCT/KR2016/009056.

*Primary Examiner* — Emmanuel E Duke
(74) *Attorney, Agent, or Firm* — KED & Associates, LLP (57) ABSTRACT

The present disclosure relates to a water purifier. A water purifier according to an aspect includes a coolant tank in which a coolant is stored, a cold water pipe accommodated in the coolant tank, an evaporator accommodated in the coolant tank, a stirring member placed inside the coolant tank to stir the coolant, and a partition member accommodated inside the coolant tank to partition an inner space of the coolant tank into a first space and a second space, wherein the evaporator is located in the first space, and the cold water pipe is located in the second space.

14 Claims, 10 Drawing Sheets

(51) Int. Cl.
    *F25D 11/02*     (2006.01)
    *B01D 39/20*     (2006.01)
    *F28D 1/047*     (2006.01)
    *F28F 13/12*     (2006.01)
    *F28D 7/02*     (2006.01)
    *F25D 31/00*     (2006.01)

(52) U.S. Cl.
    CPC ............ *F25D 11/02* (2013.01); *F25D 31/002* (2013.01); *F28D 1/0472* (2013.01); *F28D 7/024* (2013.01); *F28F 13/125* (2013.01); *F25D 2400/02* (2013.01); *F28F 2250/08* (2013.01)

(56) References Cited

FOREIGN PATENT DOCUMENTS

| KR | 10-2011-0065979 | | 6/2011 |
| KR | 20110065979 A | * | 6/2011 |
| KR | 10-2012-0140417 | | 12/2012 |
| KR | 10-2015-0019118 | | 2/2015 |

* cited by examiner

LIQUID DISPENSER

CROSS-REFERENCE TO RELATED PATENT APPLICATIONS

This application is a U.S. National Stage Application under 35 U.S.C. § 371 of PCT Application No. PCT/KR2016/009056, filed Aug. 18, 2016, which claims priority to Korean Patent Application No. 10-2015-0120682, filed Aug. 27, 2015, whose entire disclosures are hereby incorporated by reference.

TECHNICAL FIELD

The present disclosure relates to a water purifier.

BACKGROUND ART

A water purifier is a device configured to filter harmful elements such as foreign substances and heavy metals contained in water through a physical scheme and/or a chemical scheme.

Contents related to a structure of a water purifier is disclosed in Korean Patent Application Publication No. 10-2015-0019118 (Feb. 25, 2015) filed and published by the applicant of the present disclosure.

The conventional water purifier disclosed in the related art, that is, a directly draining type water purifier, has a structure in which a coolant is filled in a tank, and a cold water pipe and an evaporator configured to cool the coolant are immersed in the coolant.

Thus, when a refrigerant flows into the evaporator to generate a cold water, as the temperature of the evaporator decreases to the freezing point or less of the coolant, a part of the coolant is frozen near the evaporator, so that ice is generated. Further, the coolant near the ice is cooled by the ice.

Further, a stirring member is operated to promote heat exchange between the coolant and the cold water flowing along the cold water pipe. The stirring member generates a flow in which the coolant near the evaporator moves to the cold water pipe or mixes the coolant near the evaporator with the coolant near the cold water pipe. Thus, when the stirring member is operated, the temperature of the coolant may be maintained uniform.

However, in the case of the conventional water purifier, when a flow in which the coolant near the evaporator moves to a location near the cold water pipe occurs, the ice generated in the evaporator is separated. Such separated ice (floating ice) floats in the tank according to flow of the coolant.

The floating ice generates noise while colliding with the stirring member, the evaporator, or the cold water pipe.

In addition, ice pieces irregularly moving together with the coolant by the stirring member collide with the stirring member and the cold water pipe, to damage the stirring member and the cold water pipe or deform the shape of the pipe.

DISCLOSURE OF THE INVENTION

Technical Problem

An aspect of the present disclosure is to provide a water purifier in which ice generated near an evaporator is prevented from colliding with a stirring member or a cold water pipe even when the ice is separated.

Further, another aspect of the present disclosure is to provide a water purifier in which a stirring member or a cold water pipe is prevented from being damaged or deformed.

Technical Solution

A water purifier according to an aspect may include a coolant tank in which a coolant is stored, a cold water pipe accommodated in the coolant tank, an evaporator accommodated in the coolant tank, a stirring member placed inside the coolant tank to stir the coolant, and a partition member accommodated inside the coolant tank to partition an inner space of the coolant tank into a first space and a second space.

The evaporator may be located in the first space, and the cold water pipe may be located in the second space.

The partition member may include a bottom part configured to partition the inner space of the coolant tank into the first space and the second space and having a plurality of holes for flow of the coolant.

The bottom part may be transversely arranged inside the coolant tank.

The bottom part may be in contact with an inner circumferential surface of the coolant tank.

The first space may be defined above the bottom part, the second space is defined below the bottom part, and the stirring member may pass through the partition member in the first space to be located in the second space.

A through-hole through which the stirring member is to pass may be formed in the bottom part, and the partition member may include an extension protruding from an edge of the through-hole toward the first space.

The extension may include a plurality of vertical ribs extending upward from an upper surface of the bottom part corresponding to the edge of the through-hole by a predetermined length and spaced apart from each other along a circumference of the through-hole by a specific interval, and a connection rib connecting the plurality of vertical ribs to each other.

The connection rib may be formed to have a circular band shape, and the diameter of the through-hole may be equal to or larger than the inner diameter of the connection rib.

The partition member may include a bottom part configured to partition the inner space of the coolant tank into the first space and the second space and having a through-hole therein, and an extension extending from an edge of the through-hole to the first space.

The stirring member may extend from the first space to the second space through the extension and the through-hole.

The evaporator may include a refrigerant pipe wound outside the extension in a spiral shape.

The extension may include a pipe support rib on which the refrigerant pipe is to be seated.

The refrigerant pipe supported on the pipe support rib may be spaced apart from an upper surface of the bottom part.

The cold water pipe may be wound in a spiral shape to have a cylindrical hollow shape, and the partition member may be seated on an upper surface of the cold water pipe.

A cold water pipe seating part to be seated on the cold water pipe may be provided on a lower surface of the partition member.

Advantage of the Invention

The above-configured water purifier according to an embodiment of the present disclosure has the following effects.

First, as a space in which a pipe of an evaporator is placed and a space in which a cold water pipe is placed are separated from each other by a partition member, a coolant is mixed while freely moving to the two spaces. On the other hand, ice formed near the evaporator is isolated and is thus prevented from colliding with a stirring device or the cold water pipe, so that collision noise does not occur.

Second, because the ice formed near the evaporator does not collide with the stirring device or the cold water pipe any more, the stirring device or the cold water pipe is prevented from being damaged.

MODE FOR THE INVENTION

Hereinafter, a water purifier according to an embodiment of the present disclosure will be described in detail with reference to the accompanying drawings.

Figure 1:
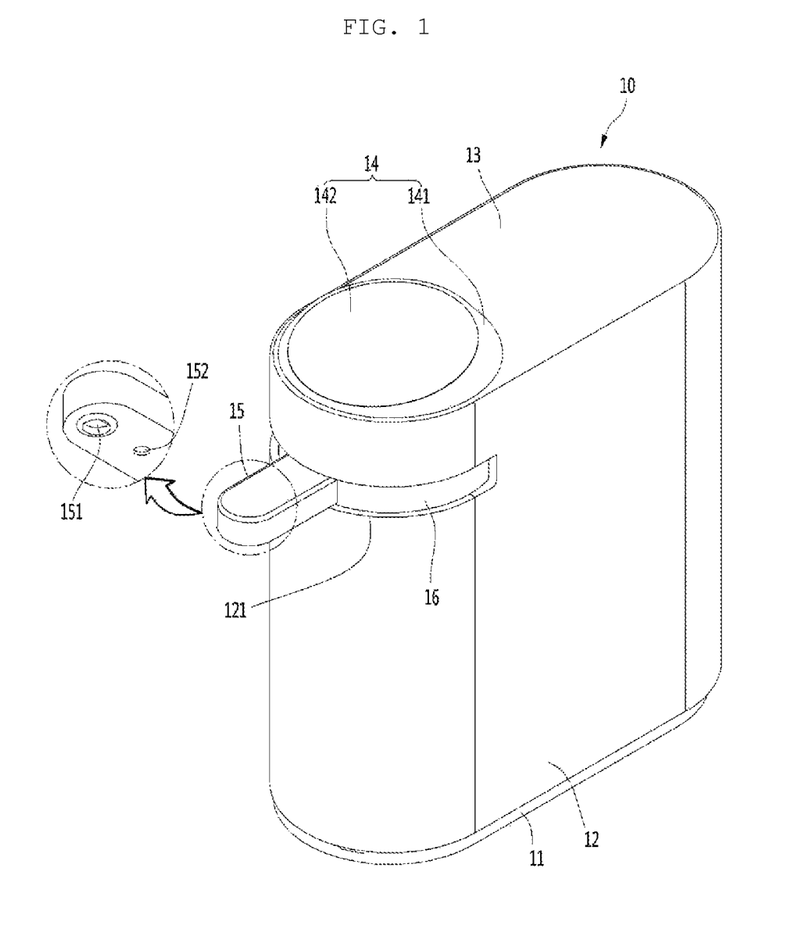
FIG. 1 is a front perspective view illustrating a water purifier according to an embodiment of the present disclosure.
Figure 2:
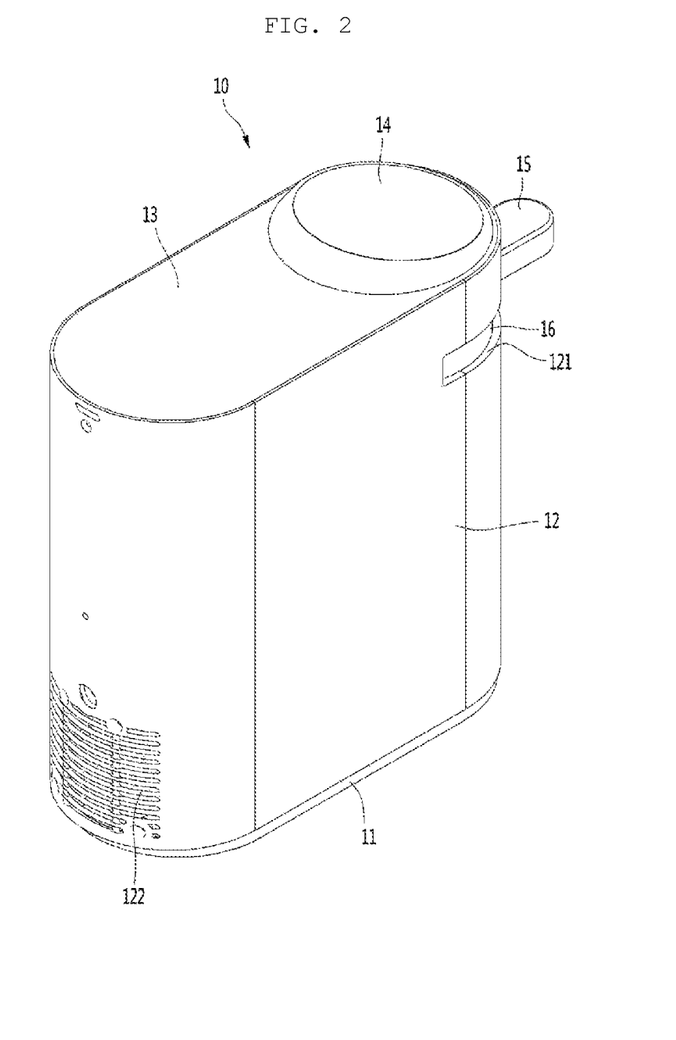
FIG. 2 is a rear perspective view illustrating the water purifier.

FIG. 1 is a front perspective view illustrating a water purifier according to an embodiment of the present disclosure, and FIG. 2 is a rear perspective view illustrating the water purifier.

Referring to FIGS. 1 and 2, a water purifier 10 according to the embodiment of the present disclosure is a directly draining type cold/hot water purifier configured to cool or heat water directly supplied from an external water source and discharge the water.

In detail, the water purifier 10 may include at least some or the entirety of a base 11 defining a bottom part, a housing 12 placed on an upper surface of the base 11, a cover 13 covering an opened upper surface of the housing 12, a control panel 14 formed on an upper surface of the cover 13, and a water chute 15 protruding from an outer circumferential surface of the housing 12.

In more detail, a part where the water chute 15 is formed may be defined as a front surface of the water purifier 10, and an opposite part thereto may be defined as a rear surface of the water purifier 10. Further, a discharge grill 122 is formed at a lower end of a rear surface of the housing 12, so that air heat-exchanged with an evaporator, which will be described below, is discharged to the outside of the housing 12.

Further, the control panel 14 may be arranged at a position close to a front end of the water purifier 10 or may be arranged at a position close to a central portion or a rear end of the upper surface of the water purifier 10 according to a design condition. Further, the control panel 14 may be inclined to become higher as it goes toward the rear side such that the control panel 14 is easily recognized by eyes of a user located in front of the water chute 15.

Figure 4:
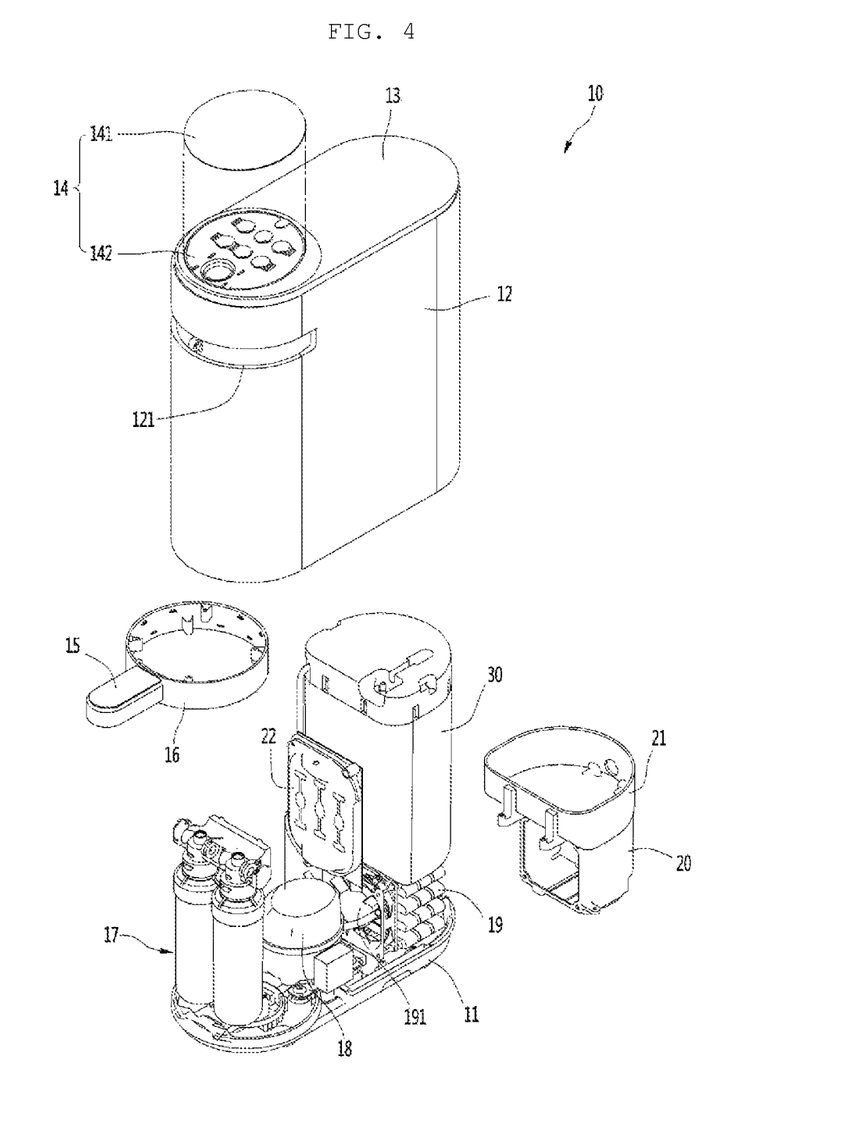
FIG. 4 is an exploded perspective view illustrating an inner configuration of the water purifier according to the embodiment of the present disclosure.

In detail, the control panel 14 may include a panel body 141 protruding from the upper surface of the water purifier 10 such that a rear end thereof is higher than a front end thereof and a panel cover 142 covering the upper surface of the panel body 141. Further, as illustrated in FIG. 4, holes or grooves on which a plurality of button units are to be mounted may be formed in the panel body 141, and buttons may be mounted on the holes or the grooves. Further, button menus corresponding to the button units may be printed on the panel cover 142, and contents related thereto will be described below with reference to the drawings.

Further, the water chute 15 may extend from the front side of the water purifier 10 along a line connecting the center of the front end and the center of the rear end of the water purifier 10 by a predetermined length, and may be mounted to be rotated to left and right sides of the center of the front end of the water purifier 10 by approximately 90 degrees, respectively. That is, the water chute 15 may be rotated by approximately 180 degrees.

Further, a circular band-shaped rotation guide 16 may be mounted on a rear end of the water chute 15 such that the water chute 15 may be rotated. The water chute 15 and the rotation guide 16 may be injection-molded in one body, or may be formed as separate components which are coupled to each other in one body through a fastening member.

Further, a guide hole 121 configured to guide rotation of the water chute 15 may be formed on the front surface of the housing 12, and the water chute 15 may be rotated to the left side and the right side along the guide hole 121 by approximately 90 degrees.

Further, a discharge port 151 configured to discharge water is formed on the bottom surface of the water chute 15. The discharge port 151 may be formed in one or plurality, and when the one discharge port 151 is provided, a passage may be formed such that cold water, purified water, and hot water are discharged through the single discharge port. On the other hand, although not illustrated, the plurality of discharge ports 151 are arranged in a row along a longitudinal direction of the water chute 15, so that the cold water, the purified water, and the hot water may be discharged from separate discharge ports.

Further, a sensor 152 may be provided on the bottom surface of the water chute 15. When a user locates a storage container such as a cup in the lower side of the water chute 15, the sensor 152 detects the storage container such that water is discharged from the discharge port. Then, the water may be prevented from being discharged from the discharge port 151 before the cup is located on the lower side of the water chute 15 after a water discharge command is input through the control panel 14.

Figure 3:
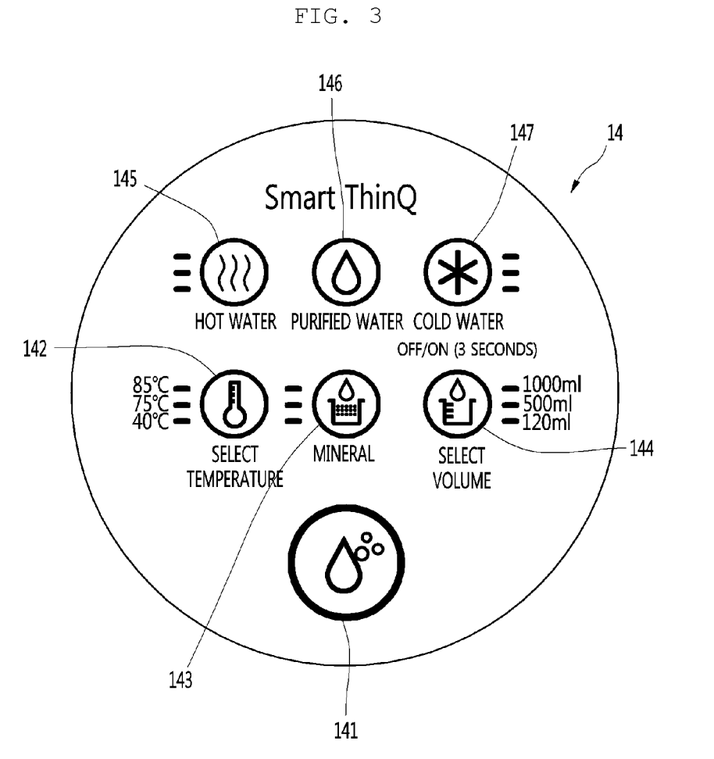
FIG. 3 is a plan view illustrating a control panel of the water purifier according to the embodiment of the present disclosure.

FIG. 3 is a plan view illustrating a control panel of the water purifier according to the embodiment of the present disclosure.

Referring to FIG. 3, input units showing various menus including selection of types and temperatures of the discharged water are printed on the panel cover 142 constituting the control panel 14.

In detail, the input units are located on the button units mounted on the panel body 141, and when the user presses any one of the input units, a button located directly below the pressed input unit is pressed to transmit an operation signal corresponding to a corresponding menu to a controller (not illustrated).

Hereinafter, the input units printed on the panel cover 142 and the button units mounted on the panel body 141 to correspond to the input units are defined as buttons, respectively.

In detail, the control panel 14 may include at least some or the entirety of a discharge button 148 configured to input the water discharge command, a temperature setting button 142 configured to select the temperature of the discharged water, a mineral water selection button 143 configured to discharge water containing minerals, a capacity setting button 144 configured to select an amount of the discharged water, a hot water selection button 145 configured to select hot water, a purified water selection button 146 configured to select purified water at the room temperature, and a cold water selection button 147 configured to select cold water cooled to a set temperature.

FIG. 4 is an exploded perspective view illustrating an inner configuration of the water purifier according to the embodiment of the present disclosure.

Referring to FIG. 4, a plurality of components including a refrigerant cycle configured to cool water and a cold water generating unit 30 configured to generate cold water are accommodated inside the housing 12 defining an outer appearance of the water purifier 10 according to the embodiment of the present disclosure.

In detail, the water purifier 10 may include at least some or the entirety of a compressor 18 placed on one side of the upper surface of the base 11 to compress a refrigerant to a high-temperature high-pressure gas refrigerant, a condenser 19 located on the rear side of the compressor 18 in the base 11 to condense the refrigerant discharged from the compressor 18, a condenser fan 191 configured to suction air in an interior where the water purifier 10 is placed and to allow the air to be heat-exchanged with the condenser 19.

Further, the water purifier 10 may further include a filter assembly 17 configured to filter foreign substances included in water supplied from a water source. The filter assembly 17 may be located on a side of the front end of the base 11. Further, the filter assembly 17 may include any one or both of a free carbon filter and a hollow fiber filter.

Further, the water purifier 10 may further include an expansion valve (not illustrated) configured to expand the refrigerant discharged from the condenser 19 to a low-temperature low-pressure two-phase refrigerant and the evaporator (described later) through which the low-temperature low-pressure two-phase refrigerant passing through the expansion valve flows.

In detail, the water purifier 10 may further include the cold water generating unit 30 including the evaporator and a cold water pipe (described later) through which the cold water flows. Although the cold water generating unit 30 may be placed above the condenser 19, the present disclosure is not limited thereto.

Further, the water purifier 10 may further include a guide duct 20 surrounding the condenser 19 and a tank support 21 supporting the bottom surface of the cold water generating unit 30. Further, the tank support 21 and the guide duct 20 may be plastic-injection-molded in one body or may be provided as separate products which are coupled to each other in one body through a fastening member.

Further, the water purifier 10 may further include a hot water heater 22 configured to heat supplied water to a set temperature.

Figure 5:
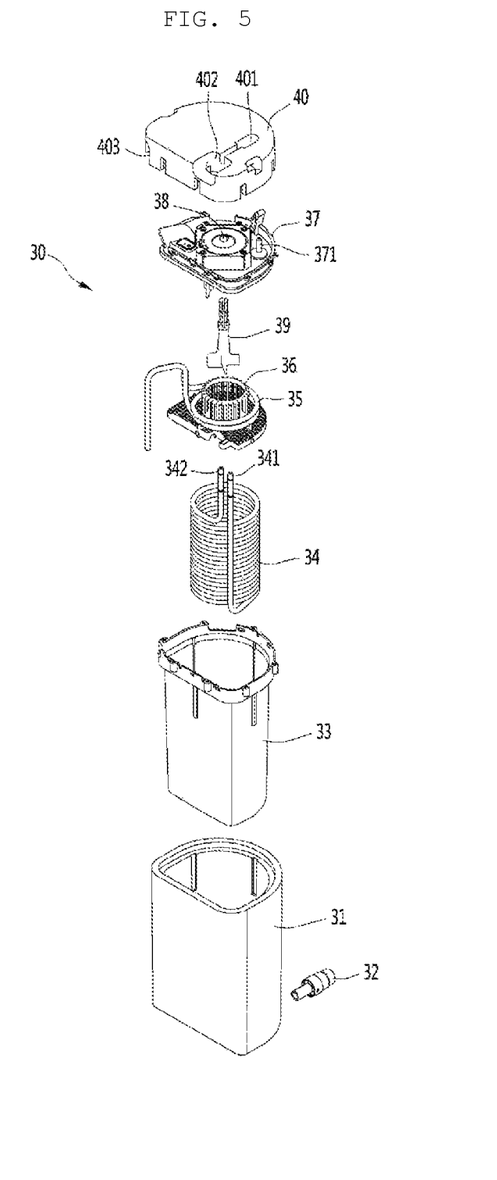
FIG. 5 is an exploded perspective view illustrating a cold water generating unit according to the embodiment of the present disclosure.
Figure 6:
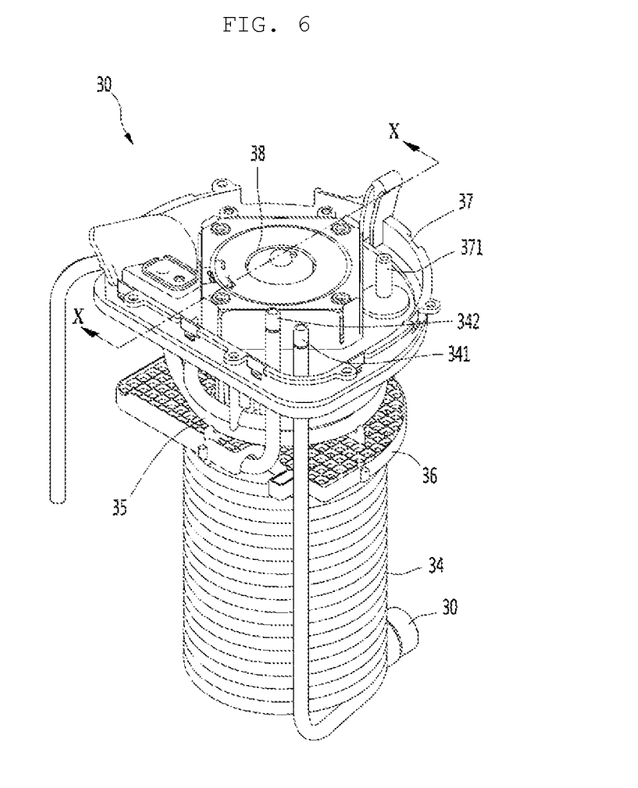
FIG. 6 is a perspective view illustrating the coupled cold water generating unit in a state in which a case is removed.
Figure 7:
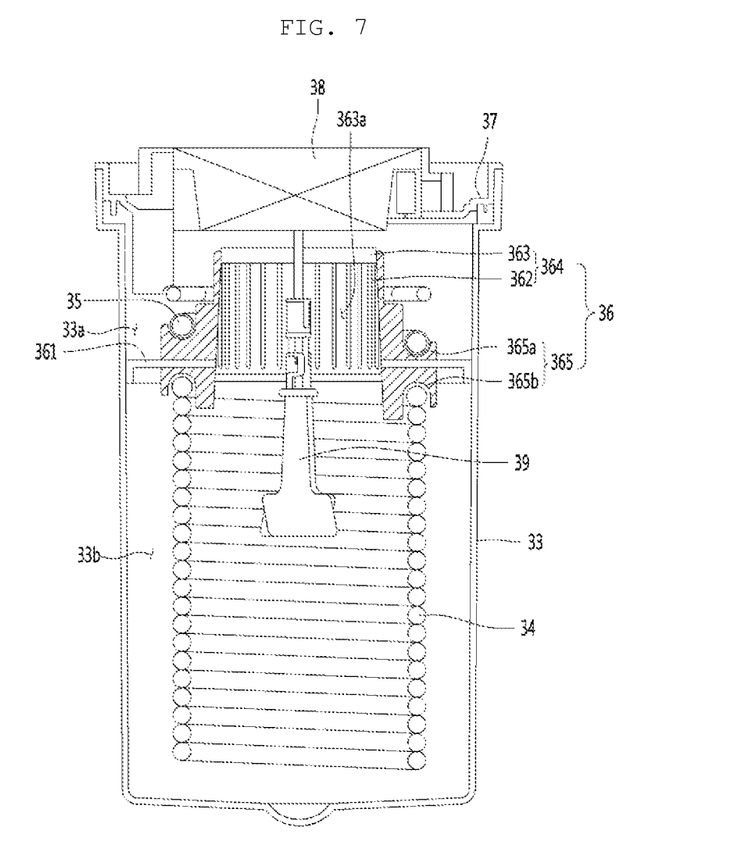
FIG. 7 is a longitudinal sectional view taken along line A-A of FIG. 6.

FIG. 5 is an exploded perspective view illustrating a cold water generating unit according to the embodiment of the present disclosure, FIG. 6 is a perspective view illustrating the coupled cold water generating unit in a state in which a case is removed, and FIG. 7 is a longitudinal sectional view taken along line A-A of FIG. 6.

Referring to FIGS. 5 and 7, the cold water generating unit 30 according to the embodiment of the present disclosure may include some or the entirety of a coolant tank 33 in which a coolant is filled, an insulation case 31 accommodating the coolant tank 33 to insulate the coolant tank 33 from the indoor air, a drain valve 32 passing through the insulation case 31 to communicate with an inner space of the coolant tank 33, and a cold water pipe 34 accommodated inside the coolant tank 33.

Further, the cold water generating unit 30 may further include at least some or the entirety of a partition member 36 accommodated inside the coolant tank 33 while being placed on the upper side of the cold water pipe 34, an evaporator 35 seated on the partition member 36, a stirring motor support 37 caught by the upper end of the coolant tank 33, a stirring motor 38 fixed to an inside of the stirring motor support 37 and having a rotary shaft extending downward, a stirring member 39 accommodated inside the coolant tank 33 and connected to the rotary shaft of the stirring motor 38, and a tank cover 40 covering an upper opening of the coolant tank 33.

In detail, the drain valve 32 is installed through the insulation case 31 and the coolant tank 33, and is inserted through a side surface of the insulation case 31, which corresponds to a point that is adjacent to the bottom part of the coolant tank 33. Further, when the drain valve 32 is opened, the coolant stored in the coolant tank 33 is discharged to the outside of the water purifier 10.

Further, the insulation case 31 may be formed of an insulation material such as expanded polystyrene, and the insulation case 31 may be seated on the tank support 21.

Further, the cold water pipe 34 may have a cylindrical shape as it is wound in a spiral shape as illustrated. Pipes vertically adjacent to each other may be in contact with each other or may be spaced apart from each other by a predetermined distance. Further, an inlet end 341 and an outlet end 342 of the cold water pipe 34 may vertically extend toward the tank cover 40. Further, the inlet end 341 of the cold water pipe 34 may be connected to a water pipe connected to the water source, and the outlet end 342 may be connected to a water pipe connected to the discharge port 151 of the water chute 15.

Further, the partition member 36 is placed on the upper side of the cold water pipe 34, so that the inner space of the coolant tank 33 may be partitioned into a first space 33a in which the evaporator 35 is accommodated and a second space 33b in which the cold water pipe 34 is accommodated. Thus, ice formed in the first space 33a cannot move to the second space 33b.

In detail, the first space 33a is a space above a bottom part 361 of the partition member 36 and the second space 33b is a space below the bottom part 361.

Because the bottom part 361 partitions the coolant tank into the first space and the second space, a part of the cold water pipe 34 located in the second space 33b may pass through the bottom part 361 to extend to the first space 33*a*. As an example, the inlet end 341 and the outlet end 342 of the cold water pipe 34 may pass through the bottom part 361.

Further, the partition member 36 may be seated at the upper end of the cold water pipe 34, and a cold water pipe seating part 365*b* on which the cold water pipe 34 is seated may be formed on a bottom surface of the bottom part 361.

Further, the evaporator 35 is placed on the upper side of the partition member 36. At this time, the evaporator 35 may be provided in a form in which a refrigerant pipe is wound on an outer side of an extension 364 extending upward from the bottom part 361 several times.

The evaporator 35 is connected to an outlet end of the expansion valve connected to an outlet end of the condenser 19. Further, the refrigerant flowing along the refrigerant pipe forming the evaporator 35 is heat-exchanged with the coolant stored in the coolant tank 33 to cool the coolant. Further, the coolant is heat-exchanged with drinking water flowing along the cold water pipe 34 to cool the drinking water to a set temperature.

Further, the stirring motor support 37 is provided to be caught by the upper end of the coolant tank 33 so as to cover the upper surface of the first space 33*a*. That is, the first space 33*a* may be defined between the stirring motor support 37 and the partition member 36, and the second space 33*b* may be defined between the partition member 36 and a bottom part of the coolant tank 33. Further, a coolant inlet port 371 may be formed on one side of the stirring motor support 37. The coolant inlet port 371 is connected to the water pipe connected to the water source, so that the coolant is supplied to and filled in the coolant tank 33.

A third space 363*a* may be formed inside the partition member 36. The stirring member 39 may pass through the third space 363*a*.

Further, although the stirring member 39 may pass through the third space 363*a* to be located at approximately a central point of the second space 33*b*, the present disclosure is not limited thereto.

A distal end of the stirring member 39 located in the second space 33*b* is formed in an impeller form.

Further, when the stirring member 39 is rotated by driving of the motor 38, the coolant in the tank 33 is mixed while freely flowing between the first space 33*a* and the second space 33*b*. That is, a flow in which the coolant near the impeller moves toward an outer wall of the tank 33, moves to the upper side of the tank 33 in turn, and then moves to the first space 33*a* occurs by rotation of the impeller formed at the distal end of the stirring member 39. Continuously, a flow in which the coolant passes through the third space 363*a* and moves to the second space 33*b* again occurs (or a reverse flow may occur). Thus, a coolant flow in which the coolant of the first space 33*a* near the evaporator 35 moves to the second space 33*b* occurs. Such flow of the coolant is smoothly performed through holes 361*b* and 362*a* of the partition member 36.

As a result, the temperature of the coolant cooled by the evaporator 35 (or ice generated by the evaporator) is maintained uniform at all points inside the coolant tank 33. Although the stirring member 39 may be formed in the shape of a blade or an impeller extending radially from a rotary shaft as illustrated, the present disclosure is not limited thereto, and various shapes may be proposed. Further, although the stirring member 39 driven by the motor 38 to generate the flow of the coolant is used in the present disclosure, the flow of the coolant may occur by using a pump or the like.

Further, while the ice formed in the first space 33*a* is melted by a stirring motion of the stirring member 39, the coolant in the first space 33*a* and the second space 33*b* is cooled.

The ice (floating ice) separated from the evaporator 35 is isolated inside the first space 33*a* by the partition member 36, and thus may not move to the second space 33*b*. That is, when a flow in which the coolant moves from the first space 33*a* to the second space 33*b* occurs, the floating ice in the first space 33*a* fails to move to the second space 33*b* due to ribs 361*a* and 362 of the partition member 36.

Thus, a phenomenon in which the ice collides with the stirring member 39 or the cold water pipe 34 to generate noise may be prevented.

Meanwhile, the tank cover 40 is fitted in an outer circumferential surface of an upper end of the insulation case 31 to cover an opened upper surface of the insulation case 31 and the coolant tank 33. Further, a port accommodating hole 401 through which the coolant inlet port 371 passes and is exposed to the outside may be formed in the tank cover 40. Further, a cold water pipe guide groove 402 through which the inlet end 341 and the outlet end 342 of the cold water pipe 34 pass may be formed at one edge of the tank cover 40. Further, an evaporation pipe guide hole 403 through which a pipe of the evaporator 35 passes may be formed at the other edge of the tank cover 40.

Figure 8:
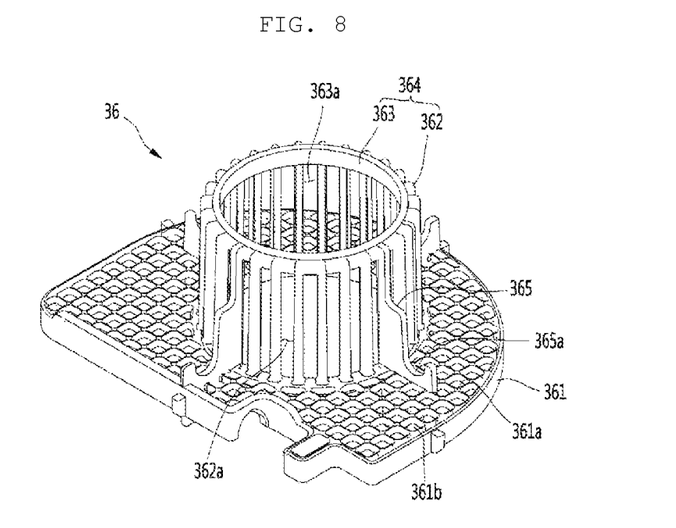
FIG. 8 is a perspective view a partition member mounted on the cold water generating unit of the water purifier according to the embodiment of the present disclosure when viewed from the above.
Figure 9:
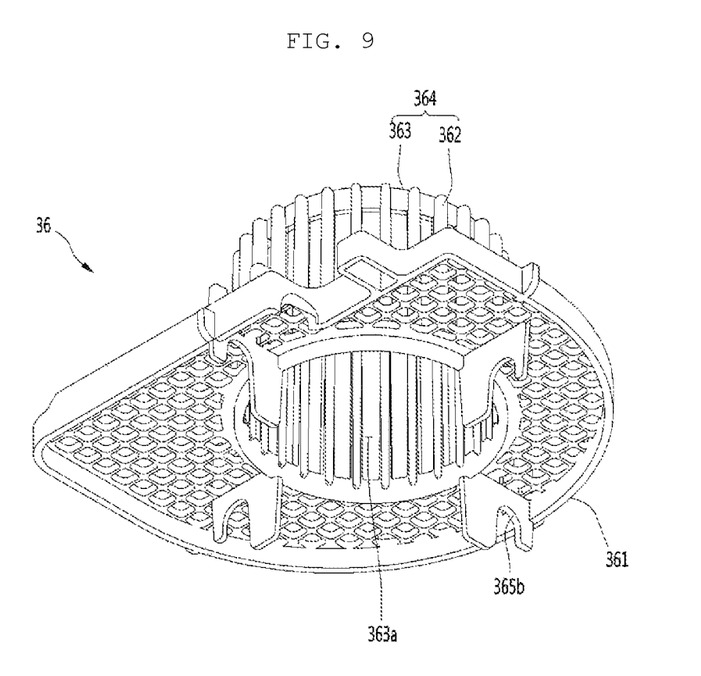
FIG. 9 is a bottom perspective view illustrating the partition member when viewed from the bottom.

FIG. 8 is a perspective view a partition member mounted on the cold water generating unit of the water purifier according to the embodiment of the present disclosure when viewed from the above, and FIG. 9 is a bottom perspective view illustrating the partition member when viewed from the bottom.

Referring to FIGS. 7 to 9, the partition member 36 may be formed of plastic injection molding.

In detail, the partition member 36 may include the bottom part 361 transversely placed inside the coolant tank 33 and the extension 364 extending upward from the bottom part 361.

The bottom part 361 partitions the inner space of the coolant tank 33 into the first space 33*a* and the second space 33*b*.

The bottom part 361 may include a plurality of lattice ribs 361*a*, and holes 361*b* through which the coolant passes are formed between the plurality of lattice ribs 361*a*. That is, the coolant may freely move in the first space 33*a* and the second space 33*b* through the holes. Further, the bottom part 361 is formed to have substantially the same shape as the cross section of the inner space of the coolant tank 33. That is, an outer circumferential surface of an edge of the bottom part 361 is in contact with an inner circumferential surface of the coolant tank 33.

Further, a through-hole through which the stirring member 39 passes is formed approximately at the center of the bottom part 361, and the extension 364 extends upward from an edge of the through-hole. As an example, although the through-hole may be formed to have a circular shape, the present disclosure is not limited.

In detail, the extension 364 may include a plurality of vertical ribs 362 extending upward from the edge of the through-hole and a circular band-shaped connection rib 363 connecting the plurality of vertical ribs 362.

In more detail, the plurality of vertical ribs 362 are spaced apart from each other in a circumferential direction of the through-hole by a predetermined interval. The vertical ribs 362 are defined as including not only ribs vertically extending from a horizontal surface but also ribs slantingly extending from the horizontal surface in a straight line. For example, the plurality of vertical ribs 362 may extend upward in an inclined state such that the diameter of the connection rib 363 is smaller than the diameter of the through-hole formed in the bottom part 361, and such ribs should be interpreted as being included in the vertical ribs 362.

The holes 362a through which the coolant may pass are formed between the plurality of ribs 362.

The third space 363a having a cylindrical shape or a truncated conic shape may be defined by the plurality of vertical ribs 362 and the connection rib 363.

That is, the third space 363a may be defined as a stirring member passage. That is, the stirring member 39 may pass through the stirring member passage and the through-hole to be located in the second space 33b of the coolant tank 33.

Further, the refrigerant pipe constituting the evaporator 35 may be wound in a spiral shape along an outer circumferential surface of the extension 364 several times. The ice formed in the first space 33a in which the evaporator 35 is accommodated exists only in the first space 33a and may not move to the second space 33b or the third space 363a.

Further, some of the plurality of vertical ribs 362 may be pipe support ribs 365 stepped as the widths thereof are increased as it goes to the lower side.

Further, the stepped surfaces may be recessed at a curvature corresponding to the outer diameter of the refrigerant pipe constituting the evaporator 35. That is, recessed refrigerant pipe seating parts 365a may be formed in the pipe support ribs 365. Then, the evaporator 35 may be mounted on the pipe support ribs 365 without shaking. Further, the refrigerant pipe supported on the pipe support ribs 365 is spaced apart from the upper surface of the bottom part 361. Thus, the refrigerant pipe may be prevented from blocking the holes formed in the bottom part 361.

Further, the cold water pipe seating part 365b may be formed on the bottom surface of the bottom part 361, which corresponds to a part directly below the pipe support ribs 365. Like the refrigerant pipe seating parts 365a, in the cold water pipe seating parts 365b, some of the pipe support ribs 365 may be stepped, and the stepped surfaces may be rounded at a curvature corresponding to the outer diameter of the cold water pipe. Then, a pipe forming the uppermost end of the cold water pipe 34 is seated on the cold water pipe seating parts 365b.

Meanwhile, the partition member 36 may be fixed and coupled to an inner circumferential surface of the coolant tank 33 or may be simply seated at the upper end of the cold water pipe 34.

It is described in the above embodiment that the lattice ribs are formed in the bottom part. However, unlike this, the lattice ribs may not be formed in the bottom part. In this case, the coolant in the first space 33a may flow to the second space 33b through gaps between the vertical ribs 362, the third space 363a, and the through-hole of the bottom part 361.

Figure 10:
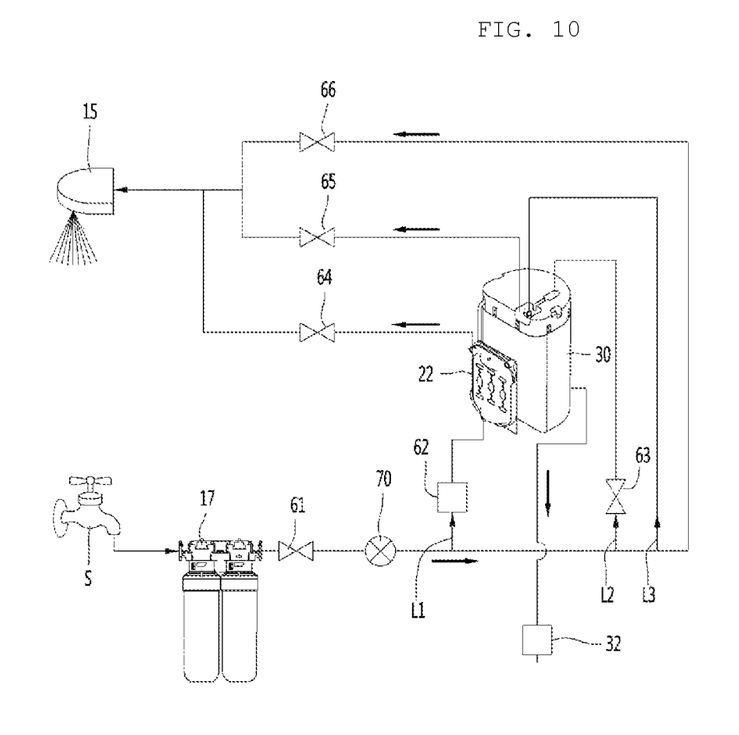
FIG. 10 is a system diagram illustrating a water passage connected to the water purifier according to the embodiment of the present disclosure.

FIG. 10 is a system diagram illustrating a water passage connected to the water purifier according to the embodiment of the present disclosure.

Referring to FIG. 10, a water supply line L may be formed from a water source S to the water chute 15 of the water purifier 10, and various valves and water purifying components may be connected to the water supply line L.

In detail, the water supply line L is connected to the water source S, for example, a faucet of a house, and the filter assembly 17 is arranged at any point of the water supply line L to filter foreign substances included in drinking water supplied from the water source S.

Further, a water supply valve 61 and a flow rate sensor 70 may be sequentially arranged in the water supply line L connected to an outlet end of the filter assembly 17. Thus, when a supply amount detected by the flow rate sensor 70 arrives at a predetermined flow rate, the water supply valve 61 may be controlled to be closed.

Further, a hot water supply line L1, a coolant supply line L2, and a cold water supply line L3 may branch from any points of the water supply line L extending from an outlet end of the flow rate sensor 70.

Further, a purified water discharge valve 66 may be mounted on an end of the water supply line L extending from the outlet end of the flow rate sensor 70, and a hot water discharge valve 64 may be mounted on an end of the hot water supply line L1. Further, a cold water discharge valve 65 may be mounted on an end of the cold water supply line L3, and a coolant valve 63 may be mounted on any point of the coolant supply line L2. In detail, the coolant valve 63 is mounted on any point of the coolant supply line L2 connecting the coolant inlet port 371 and a point where the coolant supply line L2 branches, so as to adjust an amount of the coolant supplied to the coolant tank 33.

Further, all water supply lines extending from outlet ends of the hot water discharge valve 64, the cold water discharge valve 65, and the purified water discharge valve 66 are connected to the water chute 15. Further, as illustrated, purified water, cold water, and hot water may be connected to a single discharge port or may be connected to independent discharge ports, respectively.

Further, although a state in which the drain valve 32 is mounted on the water supply line extending outward of the cold water generating unit 30 is illustrated in the drawing, actually, the drain valve 32 may be inserted through the insulation case 31, as illustrated in FIG. 5.

Meanwhile, a flow rate adjusting valve 62 may be mounted on any point of the hot water supply line L1, and the hot water heater 22 may be connected to the hot water supply line L1 extending from an outlet end of the flow rate adjusting valve 62. Further, the hot water discharge valve 64 may be mounted on any point of the water supply line L1 extending from an outlet end of the hot water heater 22.

When supplied water flows along the hot water supply line L1 and passes through the hot water heater 22, the water is heated to a set temperature, and when the hot water selection button 145 is pressed so that the hot water discharge valve 64 is opened, hot water is discharged through the water chute 15.

The invention claimed is:

1. A liquid dispenser comprising:
   a coolant tank in which a coolant is stored;
   a cold water pipe accommodated in the coolant tank;
   an evaporator accommodated in the coolant tank;
   a stirring member placed inside the coolant tank to stir the coolant; and
   a partition member accommodated inside the coolant tank to partition an inner space of the coolant tank into a first space and a second space,
   wherein the evaporator is located in the first space, and the cold water pipe is located in the second space, wherein the partition member comprises a bottom part configured to partition the inner space of the coolant tank into the first space and the second space and having a plurality of holes for flow of the coolant, wherein the first space is defined above the bottom part, and the second space is defined below the bottom part, and wherein the stirring member passes through the partition member in the first space to be located in the second space.

2. The liquid dispenser of claim 1, wherein the bottom part is transversely arranged inside the coolant tank.

3. The liquid dispenser of claim 1, wherein the bottom part is in contact with an inner circumferential surface of the coolant tank.

4. The liquid dispenser of claim 1, wherein a through-hole through which the stirring member passes is formed in the bottom part, and
wherein the partition member comprises an extension protruding from an edge of the through-hole toward the first space.

5. The liquid dispenser of claim 4, wherein the extension comprises:
a plurality of vertical ribs extending upward from an upper surface of the bottom part corresponding to the edge of the through-hole by a predetermined length and spaced apart from each other along a circumference of the through-hole by a specific interval; and
a connection rib connecting the plurality of vertical ribs to each other.

6. The liquid dispenser of claim 4, wherein the connection rib is formed to have a circular band shape, and
wherein a diameter of the through-hole is equal to or larger than an inner diameter of the connection rib.

7. The liquid dispenser of claim 4, wherein the evaporator comprises a refrigerant pipe wound outside the extension in a spiral shape.

8. The liquid dispenser of claim 7, wherein the extension comprises a pipe support rib on which the refrigerant pipe is to be seated.

9. The liquid dispenser of claim 8, wherein the refrigerant pipe supported on the pipe support rib is spaced apart from an upper surface of the bottom part.

10. The liquid dispenser of claim 1, wherein the partition member comprises:
a bottom part configured to partition the inner space of the coolant tank into the first space and the second space and having a through-hole therein; and
an extension extending from an edge of the through-hole to the first space.

11. The liquid dispenser of claim 10, wherein the stirring member extends from the first space to the second space through the extension and the through-hole.

12. The liquid dispenser of claim 10, wherein the extension comprises:
a plurality of vertical ribs extending upward from an upper surface of the bottom part corresponding to the edge of the through-hole by a predetermined length and spaced apart from each other along a circumference of the through-hole by a specific interval; and
a connection rib connecting the plurality of vertical ribs to each other.

13. The liquid dispenser of claim 1, wherein the cold water pipe is wound in a spiral shape to have a cylindrical hollow shape, and
wherein the partition member is seated on an upper surface of the cold water pipe.

14. The liquid dispenser of claim 13, wherein a cold water pipe seating part to which the cold water pipe is seated is provided on a lower surface of the partition member.

* * * * *